July 31, 1956

J. M. HOOD 2,757,062

RECORDING AND INDICATING APPARATUS

Filed May 5, 1952

James M. Hood
INVENTOR.

BY Browning & Simms

ATTORNEYS

July 31, 1956

J. M. HOOD 2,757,062

RECORDING AND INDICATING APPARATUS

Filed May 5, 1952

James M. Hood
INVENTOR.

BY Browning & Simms

ATTORNEYS

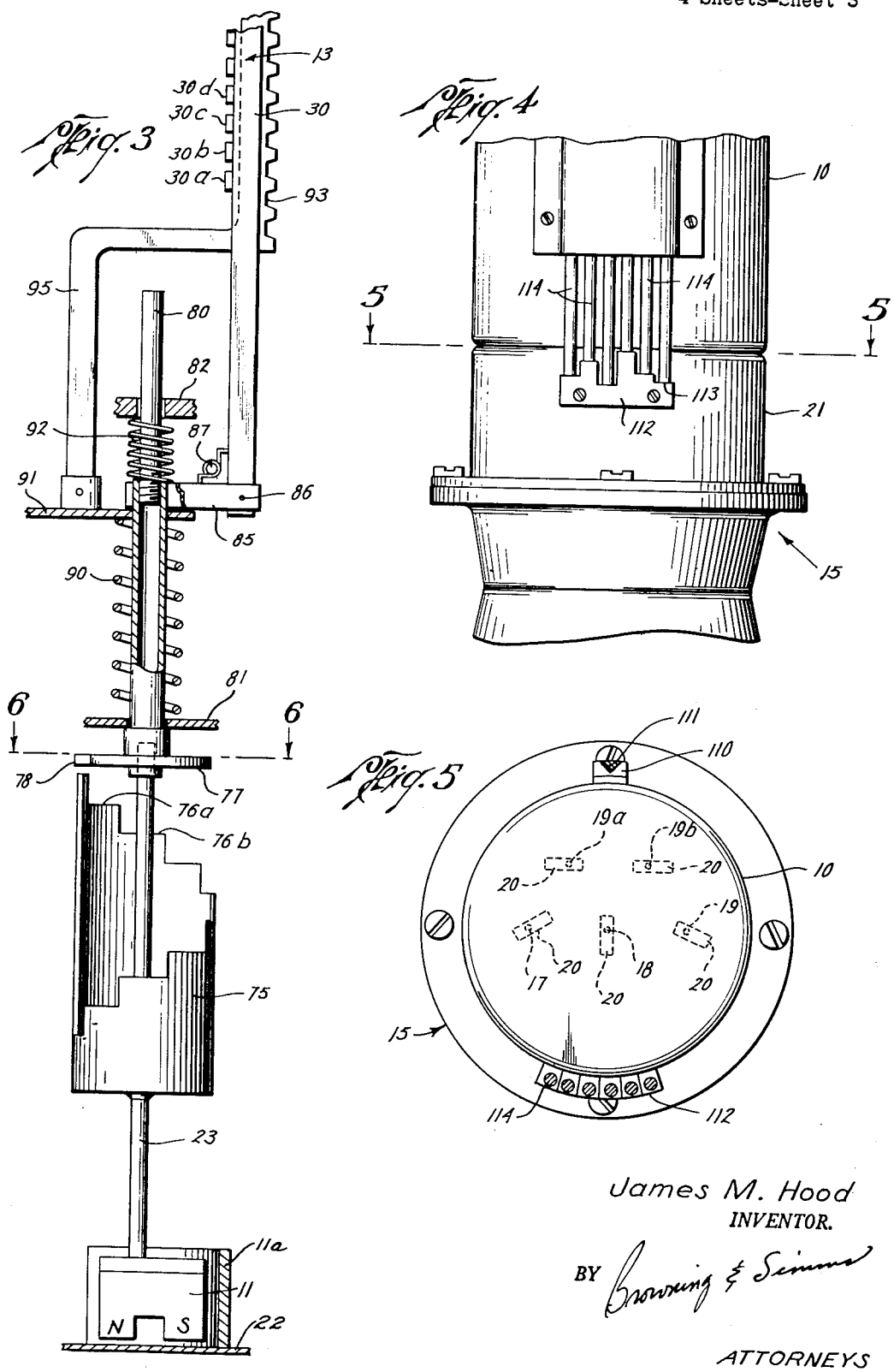

July 31, 1956

J. M. HOOD 2,757,062

RECORDING AND INDICATING APPARATUS

Filed May 5, 1952

James M. Hood
INVENTOR.

BY Browning & Simms

ATTORNEYS

United States Patent Office 2,757,062
Patented July 31, 1956

2,757,062

RECORDING AND INDICATING APPARATUS

James M. Hood, Corpus Christi, Tex.

Application May 5, 1952, Serial No. 286,109

23 Claims. (Cl. 346—78)

This invention relates to apparatus for recording or indicating the result of metering a quantity of a substance such as gas, electricity or water by a conventional meter. In one of its aspects, this invention relates to an apparatus for recording or indicating the relative rotational position of an indicating shaft turned by a metering apparatus and heretofore bearing a pointer whose position was observed through a window in the meter head.

This application is a continuation-in-part of my prior co-pending application Serial No. 253,124, filed October 25, 1951, and now abandoned.

It is conventional in commercial meters, such as meters employed to measure domestic and commercial consumption of water, gas or electricity, to provide a meter dial on which is cumulatively reflected the volume or quantity of material passing through a meter over a period of time. This dial ordinarily has a plurality of shafts each of which carries a pointer to indicate the quantity of material having passed through the meter. In water meters, for example, the various shafts and pointers indicate the tens, hundreds, thousands, tens of thousands and hundred thousands of gallons passing through the meter. The face of such a dial is observed through a glass window or cover which seals the meter head from the intrusion of moisture and other foreign matter. In systems using such meters, meter readers are employed to go to each meter, usually once a month, and record a reading by observing its dial. As is well known, such observations are subject to error and in many instances, the reader neglects to observe the meter at all and merely guesses at the result to save himself time and effort. As a result, utility companies and municipalities are constantly harassed with complaints of misreading of meters and are faced with various adjustments of bills to their customers.

Also, and particularly with water meters, the meter dials are often submerged below the surface of the ground within a surrounding housing, and it is not unusual for water and solid foreign material to fill this housing and seep into the meter head to cause it to become corroded and out of working order. This incapacitation of meters is practically inevitable when the glass which covers the meter dial face becomes broken by children or others, which often happens. Also, the glass faces often become encrusted with dirt or with condensed moisture on their inner surface which means they must be removed and cleaned. Thus, there is not only the disadvantage of depending upon unskilled help for visual reading of the meters, but, also, a constant source of repair expense in order to maintain them in operable condition.

It is an object of this invention to provide an apparatus adapted to record a meter reading accurately and which eliminates the human factor in reading meters.

Another object of this invention is to provide a recording apparatus which is simple to use and yet which is reliable so that unskilled labor can be employed to accurately record and read meters.

Another object of this invention is to provide a recording apparatus adapted to be used to read a meter, the latter being capable of being completely enclosed to eliminate the danger of breakage of glass faces and to decrease the maintenance cost of the meter, such reading being capable of accomplishment even though the meter dial is under water.

Another object of this invention is to provide a recording apparatus wherein the relative rotational pointers of indicating shafts on a meter dial is magnetically transmitted through a meter casing to a recording apparatus for making a recording of the meter reading.

Another object of this invention is to provide a recording apparatus adapted to read a meter, the apparatus being constructed so that it must actually be used to obtain a reading to thereby eliminate the falsification of records by meter reading personnel and to provide a readily usable permanent record of each meter reading.

Another object of this invention is to provide an apparatus adapted to record the relative rotational position of meter dial shafts through the agency of oppositely disposed magnets so positioned and arranged that they will magnetically align themselves with each other and thereby transmit to a recording apparatus the relative rotational position of said meter shafts.

Another object of this invention is to provide a meter reading apparatus wherein a plurality of magnets are used to drive and selectively position character bearing members for recording of a meter reading on a recording medium.

Another object of this invention is to provide a reading tool having a plurality of rotatable magnets therein, the magnets being shielded from substantial interference with each other by magnetizable metal disposed between said magnets.

Another object of this invention is to provide an apparatus wherein a first set of magnets is rotatably positioned by oppositely disposed magnets of a second set, the magnetic attraction between a magnet of the first set and an oppositely disposed magnet of a second set being relatively stronger than the magnetic attraction between said magnet of the first set and any other magnet of the first set.

Another object of this invention is to provide releasably engaging parts connecting between such magnets and members so that the magnets are free to rotate unconnected to said members except when a reading is being recorded whereby accurate positioning of the driving magnets can be achieved.

Another object of this invention is to provide a meter reading apparatus in which means are incorporated for automatically registering a serial number for the meter being read.

Another object of this invention is to provide a meter reading apparatus which will not only record a meter reading but also the serial number of the meter by simply placing the apparatus on top of the meter head and then actuating it by pressing a lever.

Another object of this invention is to provide in such a meter reading apparatus a detent means for securing proper alignment between the apparatus and a meter.

Another object is to provide such a meter reading apparatus which is adapted to record the readings of a plurality of meters by simply being placed adjacent the meter and then actuating a single element so that only one such apparatus need be supplied for each of the meter reading personnel and can be used to read a plurality of meters by each of the personnel without having to employ individual record slips for each meter.

Another object of this invention is to provide a visual reading apparatus for a meter which has been converted for use with the meter reading apparatus of this invention.

Other objects, features and advantages of this invention will be apparent to one skilled in the art upon consideration of the written specification, the appended claims and the attached drawings wherein:

Fig. 3 is a view of a portion of the apparatus of Fig. 1 and shows particularly the construction of the linkage between a magnet and a character bearing standard;

Fig. 4 is a view taken on the line 4—4 of Fig. 1;

Fig. 5 is a view taken on the line 5—5 of Fig. 4;

Like characters of reference are used throughout the several views to designate like parts.

Figure 1:
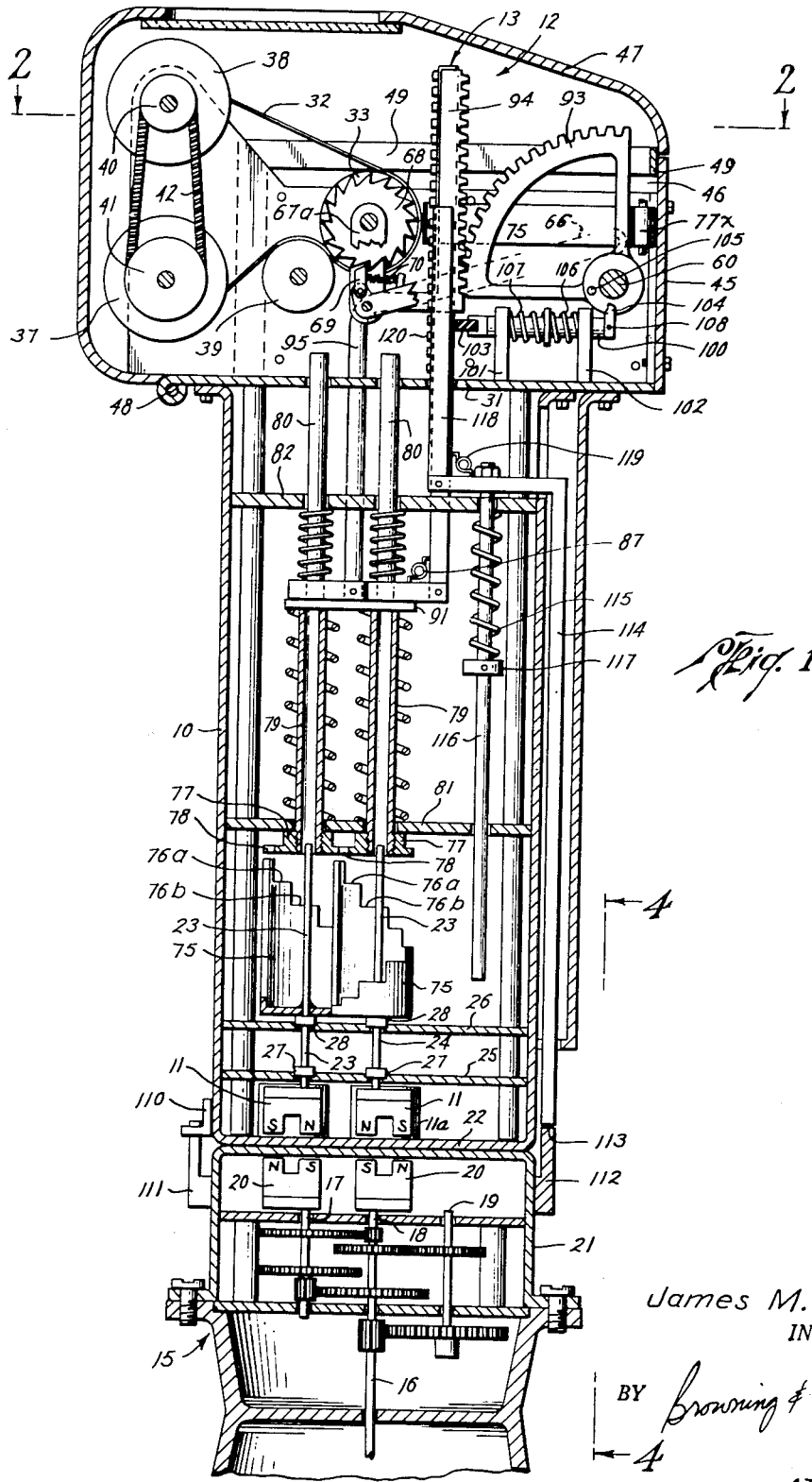
Fig. 1 is a vertical sectional view of a preferred embodiment of the apparatus of this invention shown in place upon a meter head which has been converted for use with such apparatus.

Referring to the drawings, the apparatus of this invention includes a frame 10, a plurality of magnets 11 mounted on the frame for rotation about parallel axes, a recording means designated generally by the numeral 12 and including character bearing standards 13 and linkages connecting each of the magnets to the recording means so that the rotational position of the magnets is determinative of the position of the character bearing means with respect to a recording medium. Thus, by rotating magnets 11, the character bearing standards 13 can be selectively positioned along a recording medium to impress thereon a character dependent upon relative rotational position of magnets 11.

Referring to Fig. 1, there is shown a meter head 15 having a driven shaft 16 which is rotated responsive to the passage of a quantity of material or substance, such as gas, electricity or water, through the meter, and a plurality of indicating meter shafts 17, 18 and 19 which are driven by shaft 16 through a conventional gear train. Thus, shaft 17, for example, will be rotated once for each ten rotations of shaft 16, shaft 18 will be rotated once for each hundred rotations of shaft 16, and shaft 19 will be rotated once for each thousand rotations of shaft 16. The construction of shaft 16 and the gear train connecting it with indicating shafts 17, 18 and 19 is well known to those skilled in the art and will not be further described here for that reason. It is to be understood, however, that more or less than three such indicating shafts can be employed and, in the apparatus illustrated, five such shafts are used as shown in Fig. 5. Shafts 19a and 19b are not shown in Fig. 1 to simplify and better illustrate the apparatus.

In accordance with this invention, the pointers which are conventionally mounted on the indicating shafts 17, 18 and 19 are removed and each replaced with magnets 20. The magnet for shafts 19, 19a and 19b are not illustrated in Fig. 1 to avoid complicating the drawing, it being understood that the magnets are attached in the same manner as on shafts 17 and 18. Magnets 20 are preferably of the U or horseshoe-shaped type with the north and south poles disposed to face and being closely adjacent to an imperforate cover or cap 21 which is bolted over the meter head to replace the conventional glass window type of cover. In this manner, there is provided a cover which is not subject to breakage and which can be made very strong to withstand any blows which it may encounter. It will be noted that magnets 20 can be mounted eccentrically about the shaft carrying them so that one of the poles is closer to the shaft than the other. The reason for this will be explained hereinafter.

As will be seen in Fig. 1, frame 10 is adapted to be placed over the top of cover 21 and to have a bottom or end portion 22 in close abutment therewith. Magnets 11 are each disposed within casing 10 respectively opposite one of magnets 20 and are adapted to rotate about parallel axes which are coaxial with shafts 17 and 18. Magnets 11 can be likewise eccentrically mounted on shafts 23 and 24 and are disposed so that an unlike pole may be opposite one of the poles of magnets 20. Thus, as shown in the drawing, the south poles of magnets 11 are most removed from their shafts whereas the north poles of magnets 20 are most removed from their shafts. In this manner, the maximum moment arm is obtained. Shafts 23 and 24 are rotatively carried by casing 10 by means of transverse support members 25 and 26. Suitable anti-friction devices, such as roller bearings 27 and 28, can be provided to permit free rotation of magnets 11 and of shafts 23 and 24 with a minimum of friction.

While only two of magnets 11 are shown in Fig. 1 for the sake of simplicity, it will be understood that a magnet is provided opposite each of the meter shafts appearing in the meter head and that these magnets will be respectively arranged to be rotative about an axis coaxial with one of the meter shafts as described above with respect to the magnets illustrated. It will also be understood that magnets 11 and 20 need not be eccentrically mounted as above described but can be mounted coaxially with their supporting shafts.

It will be apparent from the foregoing that, since magnets 11 are freely rotatable, the accuracy with which magnets 11 reflect the position of magnets 20 will be dependent upon the magnitude of magnetic attraction of one of magnets 11 for an adjacent one of magnets 11. Thus, when magnets 11 are relatively closely spaced together, as they ordinarily must be to function with most meters, adjacent ones of magnets 11 could exert at times a torque on each other. This torque would have to be overcome by the magnetic attraction of one of magnets 20 in order to properly align magnets 11. As a result, magnets 11 would assume a position of balance between these two opposing forces and such position would not be a true reflection of the magnets' 20 position.

To minimize the magnetic attraction among magnets 11, they, as well as magnets 20, can be spaced apart sufficiently far that the torque applied to any one of magnets 11 by any or all of the other magnets 11 is small enough that a meter reading of the desired degree of accuracy is obtained. Such spacing will be dependent upon the individual strength of magnets 11 and, to some extent, upon their shape.

Commercial meter heads in present day use will not ordinarily permit the wide spacing apart of the magnets as above set forth due to the compactness and small diameter of such heads. In such cases, the magnetic turning influence of one magnet 11 upon another magnet 11 can be overcome to permit readings of the desired degree of accuracy by providing magnets 20 to be of stronger magnetic attraction for the opposite ones of magnets 11 than is the magnetic attraction among magnets 11. Thus, magnets 20 can be larger than magnets 11 so that the magnetic attraction between opposite ones of magnets 11 and 20 is sufficiently larger than the misaligning magnetic attraction among magnets 11 that magnets 11 are aligned to the desired extent with magnets 20.

However, it is preferred to provide means for substantially eliminating the magnetic attraction among magnets 11. Such means can comprise a shield comprising a mass of magnetizable metal disposed between adjacent ones of magnets 11 and extending sufficiently far to either side of a plane through the rotative axes of such adjacent magnets that the magnetic attraction is substantially eliminated. In one form, such shield can be an annular sleeve 11a as shown in Figs. 1 and 3. Sleeve shields 11a are disposed around magnets 11 in such a manner that magnetic attraction between magnets 11 is minimized to give the desired degree of accuracy in the positioning thereof. In another form, the shields can be strips of metal, each disposed between adjacent magnets 11. Reference is made to my application Serial No. 271,391, filed February 13, 1952, where identical shields are disclosed.

With such shields, it has been found that the magnetic attraction among closely spaced magnets 11 is eliminated to the extent that rotation of one of magnets 11 does not exert any observable torque on another magnet 11. In the absence of such shields and with magnets 11 similarly spaced, each of magnets 11 will quickly be turned by the other magnets 11 until aligned with unlike poles adjacent each other.

It will thus be seen that as shaft 16 of the meter turns to position magnets 20 to a rotational position responsive to the quantity of substance passing through the meter, and when frame 10 is placed over the meter in the position shown in Fig. 1, each of magnets 11 will be attracted into alignment with respectively opposite magnets 20 due to the magnetic attraction of unlike poles. Thus, there is afforded a magnetic alignment of shaft 23 to have a rotational position corresponding to shaft 17, of shaft 24 to have a rotational position corresponding to that of shaft 18, etc. This magnetic alignment occurs across end portion 22 of frame 10 and cap 21 of the meter head and does not depend upon mechanical communication with the interior of the meter head. Thus, the latter can be sealed to the meter and can be made in one piece without any glass-to-metal joints which are prone to leak. Cap 21 and frame 10, at least that portion of the latter adjacent and including end portion 22, can be made of a non-magnetic material such as brass. Also, the lower portion of frame 10 can be made watertight for immersion in water to read a meter. Still further, the meter head can be sealed in oil to prevent corrosion and such sealing can be accomplished by providing a packing around shaft 16 and then filling the meter head with oil by any desired means.

Referring now to the recording means of this invention which is adapted to record a character upon a recording medium, the character being selected in accordance with the rotational position of one of magnets 11, and hence in accordance with the rotational position of one of the magnets 20, there are provided a plurality of indicia bearing or character bearing means 13 adapted to be selectively positioned for making a record upon a recording medium. As shown in Figs. 1 and 3, the character bearing means comprises a plurality of elongate standards 30 each having a plurality of characters 30a, 30b, 30c, 30d, etc., attached to one face thereof. These characters can be numerals, such as the numerals 0 through 9. It will be noted that the character bearing standards 30 are supported in frame 10 by passing through a slot in transverse support member 31 and are adapted to move toward and away from magnets 11 to selectively position one of the characters opposite a recording medium such as paper 32 held tautly around a printing platen roll 33. Printing platen roll 33 has a shaft 34 journaled into side support members 35 and 36. A paper supply roll 37 and a paper receiving roll 38 are likewise journaled into support members 35 and 36 for rotation thereon. An idler roll 39 is positioned adjacent to printing platen roll 33 and is adapted to maintain the printing paper taut over roll 33 and to iron out any wrinkles or creases in the paper before the paper rolls over roll 33. Pulleys 40 and 41 can be attached to the shafts of rolls 38 and 37, respectively, and joined together by a loosely fitting belt 42 adapted to slide under tension on pulley 40 to maintain the two rolls in unison and to cause roll 41 to drive roll 38 and wind paper 32 thereon.

Figure 2:
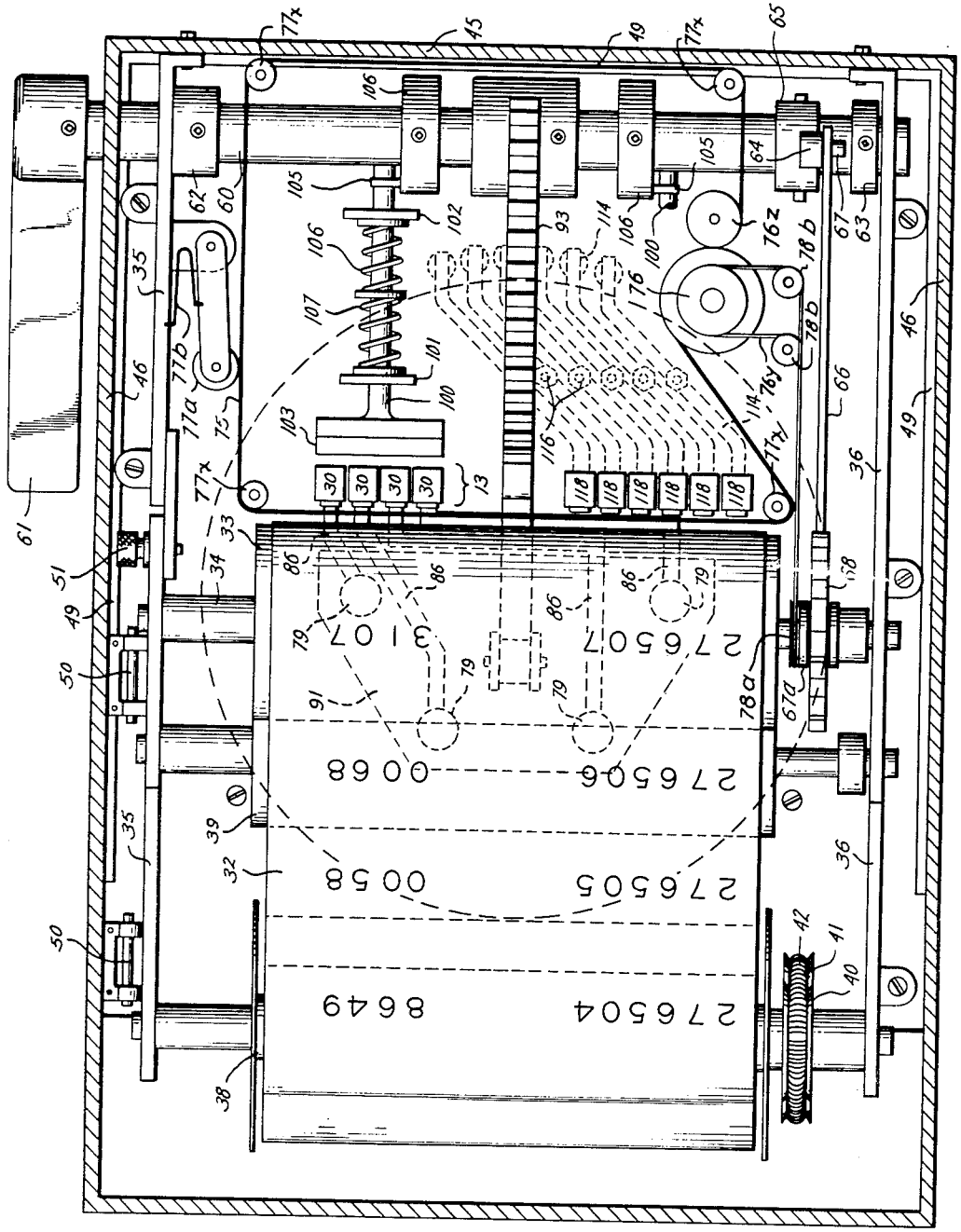
Fig. 2 is a view taken on the line 2—2 of Fig. 1.
Figure 6:
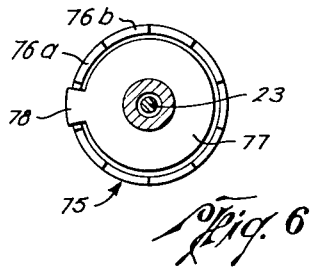
Fig. 6 is a view taken on the line 6—6 of Fig. 3.

A removable housing is provided around the recording means and can comprise in addition to transverse member 31, an end plate 45 carried by member 31, rectangular side plates 46 on each side of member 31, and a hinged cover 47 adapted to be pivoted about hinge 48 upwardly and to the left as shown in Fig. 1. A seal plate 49 can be disposed to overlap the joint between cover 47 and each of the side plates 46. Such construction provides ready access to the recording means of this invention. As illustrated in Fig. 2, the portion of side support member 35 carrying the rollers can be hinged, as by hinges 50, to swing outwardly and downwardly when the cover plate 47 is pivoted to an out-of-the-way position, to become disengaged from and free the ends of the various rolls to thereby facilitate the placement of paper 32 upon the rolls. A thumb screw 51 can be provided to secure the hinged portion member 35 to the unhinged portion to hold it in proper position.

Means are provided for feeding the paper around roll 33 to present new surfaces for recording. Such means includes a shaft 60 extending externally of the housing and having a handle 61 affixed to its outer end. Collars 62 and 63 can be provided to limit endwise movement of the shaft and to hold it in place within the housing between end support members 35 and 36. Arm 64 extends from collar 65, affixedly attached to shaft 60, and is pivotally connected to a throw arm 66 by means of pin 67. The other end of throw arm 66 is pivotally connected to one end of a link 67a whose other end is carried by shaft 34 and is free to rotate with respect thereto. Shaft 34 has a ratchet 68 keyed to it and adapted to be rotated by a pawl 69 carried by throw arm 66 and biased into the teeth of ratchet 68 by spring 70.

Thus, it is believed to be apparent that as shaft 60 is rotated in a counterclockwise direction as shown in Fig. 1, throw arm 66 will move pawl 69 clockwise around ratchet 68, spring 70 permitting depression of the pawl as it passes over each tooth. Then, upon revolution of shaft 60 in a clockwise direction, pawl 69 will engage a tooth of ratchet 68 and cause roll 33 to revolve to thereby present a new impression surface to the character bearing means 13. Preferably, the circumferential spacing between adjacent teeth of ratchet 68 and the throw of lever 66 is adjusted to be such that pawl 69 will pass from one tooth of ratchet 68 to an adjacent one each time it is actuated.

Passing between the character bearing means and the opposing surface of printing platen roll 33 is an endless self-inking type ribbon 75 driven past the printing face of roll 33 by drive roller 76 and guided by idler rollers 77 as shown. A tension roller 77a can be biased by spring 77b against the ribbon to maintain it taut. Roller 76 is driven by belt 76y passing over pulley 78a on the platen roll shaft and around idler pulleys 78b. A felt inking roller 76z is disposed in contact with the ribbon to re-ink it. Thus, the endless ribbon is synchronized with the paper movement to present a new inking surface of the ribbon to the printing characters each time after they have made a recording.

Linkages are provided for connecting character bearing means 13 with magnets 11 in such a manner that the character bearing means will be selectively positioned opposite roll 33 in accordance with the rotative position of the magnets. These linkages each comprise parts adapted to be placed in releasable engagement whereby magnets 11 are free to rotate without connection to the recording means except during the time when a recording is being made. Such parts can comprise cylinders 75, each respectively carried on the shafts 23 and 24 of magnets 11 for rotation therewith. The endwise faces of the cylinders most removed from magnets 11 are formed in the shape of a cam, illustrated in the drawings as a stepped cam having a plurality of steps 76a, 76b, etc. Preferably, there are as many steps provided in the cam surface as there are characters in one of the character bearing standards carrying members and, in most instances, there will be ten of these steps. Positioned coaxially opposite cylinders 75 are parts 77 which are non-rotatively carried with respect to frame 10 and having a finger or arm portion 78 adapted to engage one of the steps of the cam surface. Parts 77 are carried upon hollow shafts 79 which have extensions 80, the extensions and shafts being slidably received in transverse support members 81, 82 and 31 of frame 10. Shaft 79 is made hollow to receive an extension of shaft 23 and thereby prevent any substantial misalignment between parts 77 and cylinders 75. Shafts 79 are each connected to a character bearing standard 30 by an arm 85 (Fig. 3) which is pivoted thereto by a pin 86. Standard 30 is biased away from contact with ribbon 75 and printing platen roll 33 by a spring 87. Arms 85 can be formed, as shown in Fig. 2, to connect with the various shafts 79 which are disposed coaxially with the shafts 17, 18, 19, etc., of the meter head and yet permit the character bearing standards 30 to be placed in side-by-side position as shown in Fig. 2.

Figure 7:
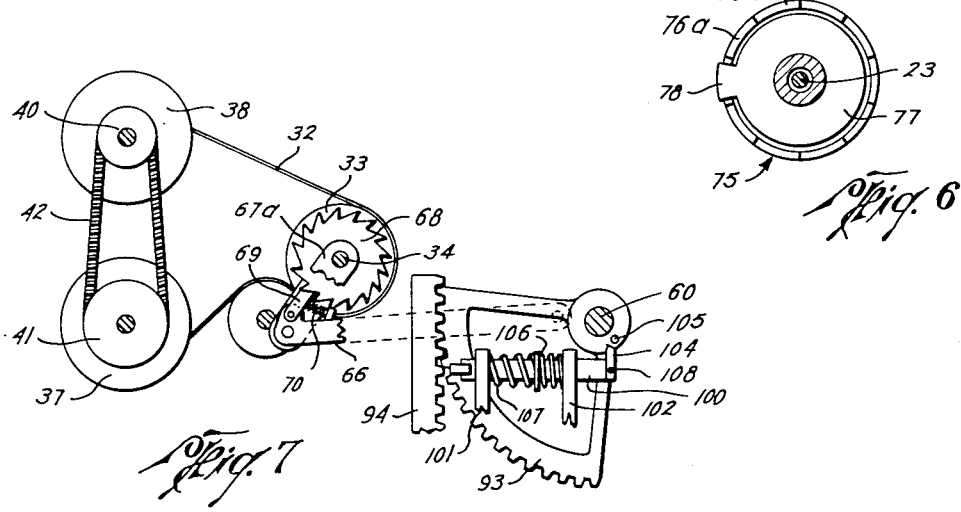
Fig. 7 is a view of a portion of the recording apparatus of Fig. 1 and shows the apparatus after the character bearing standards have been positioned for making a record and just before such record has actually been made.

Means are provided for biasing the releasably engaging parts out of contact and for releasing such bias. Thus, spring 90 is provided between member 81 and plate 91 to bias parts 77 out of contact with cylinders 75. Plate 91 fits freely over shafts 79 and is in common abutment with members 85 which, as it will be recalled, are fixedly connected to shafts 79. Disposed on the other side of plate 91 and opposing springs 90 are other springs 92 which abut against member 82 at one of their ends and against arms 85 at their other ends to act as a biasing means for moving parts 77 into contact with cylinders 75. Springs 90 are preferably made stronger than springs 92 and will maintain the latter in a compressed position except when the force of springs 90 is relieved from acting against arms 85. Means are provided for relieving this biasing action of springs 90 and can comprise a sector gear 93 carried by shaft 60 and adapted to mesh with a rack gear 94 to depress the latter from its Fig. 1 position to that shown in Fig. 7. Rack gear 94 is connected by means of arm 95 to plate 91.

Thus, in the Fig. 1 position parts 77 are maintained out of contact with cylinders 75 by springs 90, but upon counterclockwise rotation of shaft 60, sector gear 93 causes rack 94 to depress plate 91 to remove the biasing effect of springs 90 on shafts 79. As this bias is removed, springs 92 press arms 85, character bearing standards 30 and shafts 79 downwardly toward the respective cylinders 75 until contact portions 78 of parts 77 bear against one of the stepped portions of the cammed surface of cylinders 75. Since cylinders 75 are rotated by magnets 11 and since contact portions 78 are maintained in a relatively non-rotative position, it will be apparent that contact portions 78 will be depressed by springs 92 in accordance with the respective rotative positions of cylinders 75 and magnets 11. The extent of depression of each of parts 77 will in turn be reflected by a corresponding depression of the respective standards 30 to thereby position one of the reference characters 30a, etc., opposite platen roll 33 and permit an impression to be made thereon. The spacing between the various reference characters borne by a single standard should be equal to the difference in height between each of the steps around the cammed surface of cylinder 75.

Means are provided for pressing the character bearing standards against press platen roll 33 and can be considered as part of the character bearing means. These can comprise a plunger 100 carried by arms 101 and 102 and having a face member 103, preferably a rubber or like material, adapted to extend behind all of the character bearing standards 30. The other end of plunger 100 is formed into a catch portion 104 adapted to engage a pin 105 carried on collar 106 of shaft 60. As this shaft rotates, pin 105 engages catch 104 and draws plunger 100 away from the character bearing standards thereby compressing spring 106 against support 102. Pin 105 is maintained in engagement with the catch throughout the rotation of the shafts 60 until plate 91 has been adequately depressed to permit springs 92 to bring parts 77 in contact with cylinders 75 and thereby position the proper character opposite the printing surface. Then, upon an incremental additional rotation of shaft 60, pin 105 becomes disengaged from catch 104 thereby permitting spring 106 to push plunger 100 towards the character bearing standards 30 thereby forcing them against the paper on roll 33. A spring 107 is provided to oppose spring 106 and returns the plunger to a neutral position ready to again receive pin 105 for another snap against the character bearing standards. Catch 104 can be pivoted to plunger 100 by pin 108 to permit pin 105 to rotate in a clockwise direction to the position shown in Fig. 1 after the plunger has been snapped against the character bearing standards. Thus, it will be seen that upon disengagement of pin 105 from plunger 100, the plunger will be snapped against the character bearing standards due to the energy of spring 106 and the momentum generated thereby to momentarily push a character against ribbon 75 and paper 32 on roller 33. Spring 107 then draws plunger 100 to a neutral position where face member 103 will not rub against the character bearing standards. As stated, spring 87 maintains the character bearing standards out of contact with the paper on roll 33 except when forced thereagainst by plunger 100.

In accordance with this invention, means are provided for indexing frame 10 and, accordingly, magnets 11, with respect to the meter head 15. This means can comprise a detent 110 carried by frame 10 and adapted to engage a mating detent 111 carried by the cover 21 of the meter head. In this manner, shafts 23, 24, etc., can be positioned coaxially with shafts 17, 18, etc., respectively, thereby insuring that the maximum magnetic attraction will exist between magnets 11 and 20 and also that these magnets will be in exact alignment.

In accordance with another feature of this invention, there is provided an indexing mechanism adapted to print an index number on paper 32 in accordance with a keying or coding member carried by the meter head. The coding member comprises a part 112 having a stepped cam surface 113 and attached to cap 21 of the meter head. Positioned oppositely this stepped cam surface are a plurality of contact members 114 each of which are biased toward the coded member by springs 115 whereby each of the contact members will assume a longitudinal position relative to the meter head corresponding to the individual elevations of the stepped portions of the cam surface of part 112. Springs 115 are carried on rods 116 sliding in support members 81 and 82 to press against collars 117 carried by rods 116 and at their other ends against member 82. Rods 116 are individually connected to contact members 114 and serve to bias them downwardly towards part 112. Connected to contact members 114 is a character bearing means comprising a plurality of character bearing standards 118 which are biased away from paper 32 on roll 33 by by means of springs 119. These character bearing standards, similar to the character bearing standards 30, carry a plurality of characters 120 disposed along their length and are adapted to be selectively positioned opposite the printing surface of roll 33 in accordance with the elevational position of contact members 114. Thus, by selecting a combination of elevations for cam surfaces 113, any of a number of various meter code or index numbers can be printed on paper 32 to identify the particular meter being read.

A means for pressing the character bearing standards 118 against the paper on roll 33 is provided and is similar in structure to that described for character bearing standards 30 and will not be described again at this point. The parts comprising these means are correspondingly numbered to those for standards 30. Also, as with the character bearing means 13, the charatcer bearing means for the indexing or serializing mechanism can be said to include the means for pressing the standards against the paper on which the serial number of the meter is printed.

While the operation of the apparatus of this invention is believed to be apparent from the foregoing, a short description thereof will be given at this point to insure adequacy of disclosure. With the meter head 15 constructed as shown in Fig. 1, the meter reading apparatus can be placed thereover and indexed into proper position by mating together of detent 110 with detent 111 and by the engagement of contact members 114 with part 112. In placing the apparatus in the Fig. 1 position, contact members 114 will be raised in accordance with the elevational height of the stepped cam surface of member 112 to thereby position character standards 118 selectively with respect to the printing surface of roll 33 for printing a serial number for the particular meter being read. While in this position and before handle 61 is depressed, magnets 11 and cylinders 75 are free to rotate and will become aligned with respective magnets 20. Then, upon depression of handle 61, shaft 60 will be rotated to cause sector gear 93 to depress rack 94 thereby releasing the bias of springs 90 against shafts 79. Springs 92 will then cause parts 77 to move toward the cylinders until contact portions 78 contact one of the stepped portions of the cam surface of its cylinder, this being dependent upon the particular rotational position of the particular cylinder. Further rotation of shaft 60 causes pins 105 to become disengaged from catches 108 thereby permitting both of plungers 100 to press their respective standards 30 and 118 against the typewriter ribbon and paper 32 carried on roll 33. During such rotation of shaft 60, throw arm 66 will push pawl 69 into a new tooth of ratchet 63 and upon release of handle 61, and upon the shaft and attached parts assuming the Fig. 1 position, the pawl will pull ratchet 68 and roll 33 into a new printing position. Such pulling will cause paper to become unrolled from roll 37 which drives roll 38 to roll the paper thereon. The release of the handle also permits rack 94 to rise again thereby causing spring 90 to bias part 77 out of contact with cylinder 75. Handle 61, shaft 60 and attached parts are returned to the Fig. 1 position by the action of spring 90 through rack 94.

Figure 8:
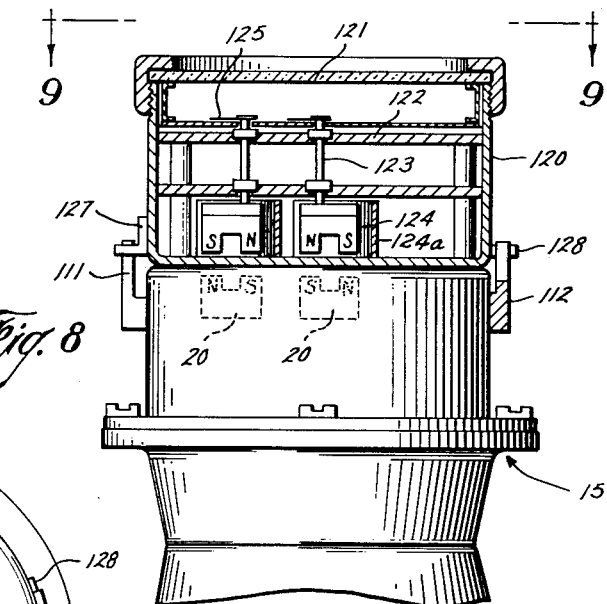
Fig. 8 illustrates a visual-type meter reading apparatus adapted to be used with a converted meter head shown in Fig. 1.
Figure 9:
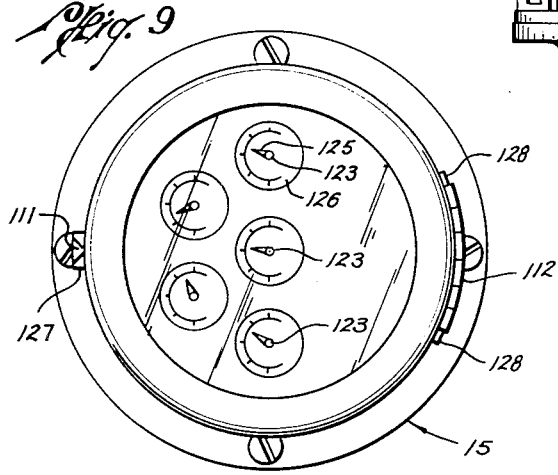
Fig. 9 is a view taken on the line 9—9 of Fig. 8.

In some instances, it might be desired to visually read the meter and since cap 21 is made of opaque metal, such will not be possible without a particular type of reading tool provided in accordance with this invention. Such tool is illustrated in Figs. 8 and 9, it being understood that the meter head itself is constructed as described with respect to Fig. 1. The visual reading tool comprises a frame 120 having a glass window 121 in its end and a meter dial 122 within the frame. Meter dial 122 supports a plurality of linkages in the form of shafts 123 which carry magnets 124 and shields 124a constructed and arranged similarly to magnets 11 in Fig. 1 so as to be positionable by the magnetic attraction of magnets 20 of the meter head. The outer ends of shafts 123 carry pointers 125 in a manner similar to conventional meter heads and thus provide indicia bearing means. The meter face 122 is provided with graduated dials 126 for each of the pointers 125 in a conventional manner. A detent 127 is provided in a manner similar to detent 110 and it is adapted to engage the corresponding detent 111 of the meter head. A second detent 128 can be provided to engage one side of member 112 and thereby position frame 120 on the meter head.

The visual reading can be taken by simply positioning the reading tool on top of the meter head and permitting magnets 124 to become aligned with magnets 20. The reading on the face of the dial, shown more clearly in Fig. 9, can be taken in a conventional manner well understood to those skilled in the art. Reference is made to my co-pending application Serial No. 424,872, filed April 20, 1954, for a more complete disclosure of the visual reader.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A recording apparatus which comprises, in combination, a frame having a portion shaped to be brought into temporary abutment with a meter head, a plurality of magnets rotatably mounted thereon, recording means carried by said frame and having a plurality of recording parts for impressing a record on a recording medium, said parts being movable so as to be selectively positioned for making a record, and linkages between each of said magnets and said parts so that the rotative position of said magnets is determinative of the position of said parts and hence of the record obtained.

2. A recording apparatus which comprises, in combination, a frame having a portion shaped to be brought into temporary abutment with a meter head, a plurality of magnets mounted thereon for rotation about parallel axes, recording means carried by said frame including a plurality of character bearing means each adapted to be selectively positioned to impress a record upon a recording medium and a linkage between each of said magnets and a character bearing means adapted to position said character bearing means responsive to the rotative position of the magnet to which it is connected, said linkage including releasably engaging parts permitting said magnets to rotate free from said character bearing means when the parts are released from engagement.

3. The apparatus of claim 2 wherein shields of magnetizable metal are disposed between adjacent ones of said magnets to substantially reduce magnetic attraction therebetween.

4. The apparatus of claim 2 in combination with a detent carried by said frame for engagement with a mating detent on a meter head so that when said detents are brought into engagement the frame is in a predetermined rotative position with respect to such meter head.

5. A recording apparatus which comprises, in combination, a frame, a plurality of magnets mounted thereon for rotation about parallel axes, a plurality of character bearing standards carried by said frame for movement past a recording medium, means for pressing said standards against said medium, and linkages between said magnets and said standards each comprising a first part connected to a magnet and a second part connected to one of the standards, said parts having releasably engaging portions adapted to position the second part and the character bearing standard according to the rotative position of the magnet and means for moving said parts into and out of engagement.

6. The apparatus of claim 5 wherein said character bearing standards are elongate and are mounted for longitudinal movement past said recording medium and wherein said first and second parts include a cam surface on one part and a portion on the other part adapted to contact said cam surface so that the rotative position of one part will determine the travel necessary for the other part to come into engagement therewith.

7. A recording apparatus which comprises, in combination, a frame, a plurality of magnets carried by said frame for rotation about parallel axes, a plurality of character bearing standards mounted for selective positioning with respect to a recording medium, and linkages between said standards and magnets each of which comprises an arcuate part having a cam surface disposed about the axis of rotation of a magnet, a second part adapted to move toward and against said cam surface, one of said parts being mounted for rotation with said magnet and the other being connected to one of said character bearing standards whereby the latter can be positioned in accordance with the rotative position of one of said magnets.

8. The apparatus of claim 7 wherein said magnets have shields comprising magnetizable metal disposed between adjacent ones of said magnets to substantially reduce magnetic attraction therebetween.

9. The apparatus of claim 7 wherein said cammed part comprises a cylinder connected to a magnet for rotation therewith, the cylinder having an end formed into a stepped cam.

10. The apparatus of claim 7 in combination with means for releasably biasing said second part away from the cam surface of said cylinder and means for releasing said biasing means.

11. The apparatus of claim 10 in combination with means for pressing said character bearing members against said recording medium after said biasing means has been released.

12. The apparatus of claim 7 wherein said character bearing standards are elongate and are mounted for movement toward and away from said magnets and each have a plurality of impression forming characters disposed along their length and wherein means are provided for pressing said members against said recording medium.

13. In a metering apparatus wherein the metered value is represented by the relative rotation of a plurality of shafts in a meter head, the combination which comprises, first magnets carried by each of said shafts for rotation therewith, second magnets opposite the first magnets and independently mounted for rotation therewith, a plurality of character bearing standards mounted for selective positioning with respect to a recording medium and linkages between each of said second magnets and a character bearing standard each of which comprises an arcuate part having a cam surface disposed about the axis of rotation of a magnet, a second part adapted to move toward and bear against the cam surface, one of said parts being mounted for rotation with a second magnet and the other being connected to one of said character bearing standards whereby the latter can be positioned in accordance with the rotative position of one of said second magnets.

14. The apparatus of claim 13 wherein said first magnets are substantially stronger in magnetic attraction than said second magnets.

15. The apparatus of claim 13 wherein shields of magnetizable material are disposed between adjacent ones of said second magnets.

16. The apparatus of claim 13 in combination with means for biasing said one of said parts away from the other, and means for releasing said bias.

17. The apparatus of claim 13 in combination with an indexing member having a cam surface, a plurality of contact members biased to engage said surface and to be positioned in accordance with its shape, a plurality of second character bearing standards connected to said contact members for positioning with respect to a recording medium responsive to the positioning of the contact members by said cam surface and means for pressing said second character bearing standards against said recording medium.

18. A recording apparatus which comprises, in combination, a frame, a magnet rotatably mounted thereon, recording means carried by said frame and having a first character bearing means adapted to be selectively positioned for making a record, a first linkage between said magnet and said character bearing means so that the rotative position of said magnet is detreminative of the position of said character bearing means, a second linkage adapted to contact and be positioned in accordance with the shape of a cam surface of a coding member and connected to a second character bearing means for positioning the latter in accordance with the shape of said cammed coding member.

19. The apparatus of claim 18 wherein said second linkage includes a contact member biased towards contact with said cam surface of said coding member.

20. A recording apparatus which comprises, in combination, a frame, a plurality of magnets rotatably carried by said frame for rotation of their poles about axes parallel to each other, hollow cylinders connected to said magnets for rotation therewith, the ends of the cylinders most removed from said magnets being formed in a stepped cam shape, a plurality of elongate character bearing standards carried by said frame for movement toward and away from said magnets, linkages between each of said standards and one of said magnets including a part adapted to move toward and away from contact with the cammed end of said cylinder, a first spring biasing said part out of contact with said cammed end, a second spring opposing said first spring and biasing said part toward said cammed end, the first spring being stronger than the second spring, a member for compressing said first spring independently of said part to remove the bias therefrom, a platen roll disposed transversely and oppositely adjacent said character bearing standards, a spring biased plunger on the side of said standards opposite from said platen roll and having a part for contacting said standards, and means for pulling said plunger away from said standards to compress said spring and then releasing the plunger to hit said standards and press them against said platen roll.

21. A recording apparatus which comprises, in combination, a frame, a magnet rotatably carried by said frame, a character bearing standard mounted for selective positioning with respect to a recording medium, and a linkage between said magnet and said standard comprising an arcuate part having a cam surface disposed about the axis of rotation of said magnet, a second part adapted to move toward and against said cam surface, one of said parts being mounted for rotation with said magnet and the other being connected to said character bearing standard whereby the latter can be positioned in accordance with the rotative position of said magnet.

22. A portable recording apparatus for meters which comprises, in combination: a frame having a portion adapted to be aligned and placed in temporary abutment with a meter head; parts rotatably mounted on said frame with each having coupling means adjacent said abutment portion, said coupling means providing for releasably coupling and rotatively aligning each of said parts into predetermined rotative alignment with one of corresponding coupling means carried by indicating shafts in a meter head from which a recording is to be taken, whereby upon placing said frame in abutment with said head and coupling together of respective ones of said coupling means, each of the parts is rotated into a predetermined rotative alignment with respective ones of said indicating shafts; recording means including a support for a recording medium and parts for forming a record on a medium so supported, said forming parts being movable through a plurality of positions to determine the record made on the medium; and linkage means between the first mentioned parts and said forming parts to selectively position said forming parts in accordance with the rotative position of the first mentioned parts.

23. In a metering apparatus wherein the metered value is represented by the relative rotative position of a plurality of shafts in a meter head, the combination which comprises: first coupling means carried by each of said shafts for rotation therewith; a portable frame having a portion adapted to be aligned with and placed in temporary abutment with the meter head; a plurality of second coupling means rotatably mounted on said frame adjacent said abutment portion, said first and second coupling means respectively being arranged in pairs with each other, said coupling means of each pair providing for releasably coupling and rotatively aligning the same in predetermined rotative alignment relative to each other so that upon bringing said frame into abutment with the meter head, each of said second coupling means is always rotated into the same predetermined rotative position relative to the respective ones of said shafts; recording means including parts for positioning a recording medium to receive a record thereon and parts for forming a record on a medium so positioned, said forming parts being movable through a plurality of positions to determine the record made on the medium; and linkage means between said second coupling and said forming parts to selectively position said forming parts in accordance with the rotative position of the first coupling means.

References Cited in the file of this patent

UNITED STATES PATENTS

| | | |
|---|---|---|
| 2,445,979 | Thompson | July 27, 1948 |
| 2,449,283 | Dike et al. | Sept. 14, 1948 |
| 2,524,299 | Sutherland | Oct. 3, 1950 |
| 2,563,762 | Uline et al. | Aug. 7, 1951 |
| 2,612,428 | Vroom | Sept. 30, 1952 |

FOREIGN PATENTS

| | | |
|---|---|---|
| 427,230 | Great Britain | Apr. 17, 1935 |